(12) United States Patent
Chiang et al.

(10) Patent No.: US 10,146,391 B2
(45) Date of Patent: Dec. 4, 2018

(54) TRANSPARENT CONDUCTIVE OXIDE FILM FOR SENSING DEFORMATION

(71) Applicant: TPK Touch Solutions (Xiamen) Inc., Xiamen (CN)

(72) Inventors: Cheng-Chung Chiang, Kaohsiung (TW); Feng Chen, Fuzhou (CN); Ho-Hsun Chi, Hsinchu (TW); Yuh-Wen Lee, Zhubei (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 15/190,350

(22) Filed: Jun. 23, 2016

(65) Prior Publication Data

US 2016/0378229 A1    Dec. 29, 2016

(30) Foreign Application Priority Data

Jun. 24, 2015  (CN) .......................... 2015 1 0351948

(51) Int. Cl.
*G06F 3/045* (2006.01)
*G06F 3/041* (2006.01)
*G01L 1/18* (2006.01)
*G01L 1/22* (2006.01)
*G01L 5/00* (2006.01)

(52) U.S. Cl.
CPC .............. *G06F 3/045* (2013.01); *G06F 3/041* (2013.01); *G06F 3/0414* (2013.01); *G01L 1/18* (2013.01); *G01L 1/22* (2013.01); *G01L 5/0019* (2013.01); *G06F 2203/04103* (2013.01); *G06F 2203/04105* (2013.01)

(58) Field of Classification Search
None
See application file for complete search history.

(56) References Cited

U.S. PATENT DOCUMENTS 5,530,209 A * 6/1996 Watanabe ............... G06F 3/045
  178/18.05
6,025,585 A * 2/2000 Holland ............ H01L 27/14601
  250/208.1

* cited by examiner

*Primary Examiner* — Brian Butcher
(74) *Attorney, Agent, or Firm* — Cooper Legal Group, LLC

(57) ABSTRACT

A transparent conductive oxide film for sensing deformation has a length, and generates a deformation amount when an external force is applied thereto, so as to change a resistance value of the transparent conductive oxide film. A ratio of the deformation amount to the length ranges from about $5 \times 10^{-5}$ to about $3.5 \times 10^{-4}$, and a rate of change of the resistance value ranges from about 0.01% to about 3%.

20 Claims, 5 Drawing Sheets

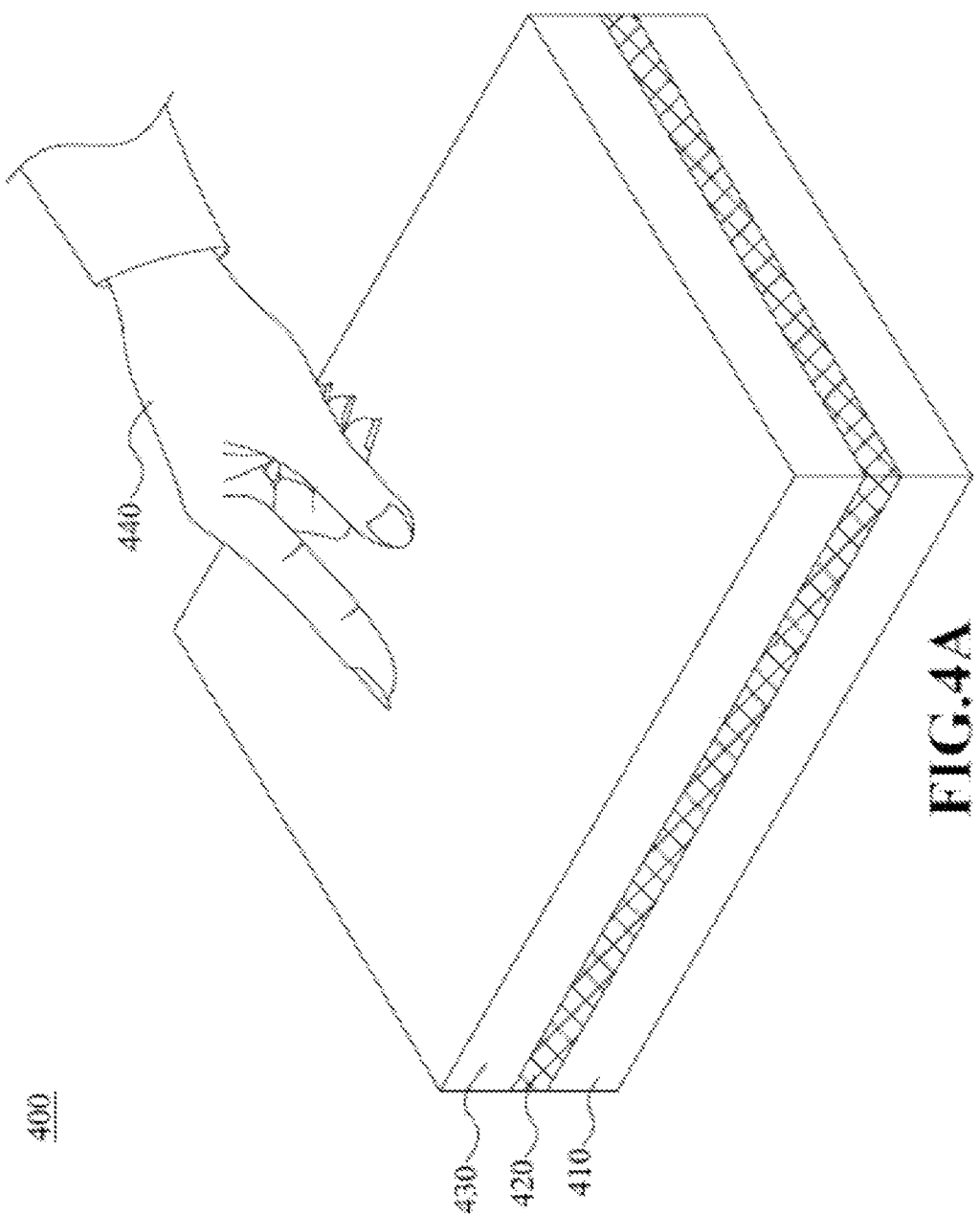

TRANSPARENT CONDUCTIVE OXIDE FILM FOR SENSING DEFORMATION

CROSS-REFERENCE TO RELATED APPLICATION

This application claims priority to China Application Serial Number 201510351948.6, filed Jun. 24, 2015, which is herein incorporated by reference.

BACKGROUND

Technical Field

The present disclosure relates to a touch technology. More particularly, the present disclosure relates to a transparent conductive oxide film for sensing deformation.

Description of Related Art

In recent years, touch panels are usually used in display screens of electronic products, such as cell phones, cameras, tablet computers, and the like, so as to enhance the convenience of operations and signal input. For example, the current common smart phones and tablet computers utilize touch panels to allow users to directly input information through screen panels, such as a handwriting recognition system.

Principles and methods for inputting are numerous. Different methods have advantages and disadvantages because of the different design methods and considerations for different applications ranges. Currently, the common touch sensors on the market are divided into two types according to their sensing principles: the capacitive type and the resistive type.

In recent years, a pressure detection device that detects the strength of a press has become increasingly popular. The pressure sensing is also called deformation sensing in which the property of a piezoresistive material is utilized. When the piezoresistive material receives a stress to deform, its resistance value will in turn change. Hence, by connecting and outputting through a circuit, a resistance change can be used to measure the touch position and force magnitude of a user. For the foregoing reasons, there is a need to provide a transparent material for sensing deformation so that it can serve as a pressure sensing layer of products requiring high transparency, such as cell phones, tablet computers, panels, and the like.

SUMMARY

An objective of the present disclosure is to provide a transparent conductive oxide film for sensing deformation that has a good optical property and resistance change effect.

One or more embodiments of the present disclosure provide a transparent conductive oxide film for sensing deformation. The transparent conductive oxide film for sensing deformation has a length, and generates a deformation amount by applying an external force so as to change a resistance value of the transparent conductive oxide film. A ratio of the deformation amount to the length ranges from about $5 \times 10^{-5}$ to about $3.5 \times 10^{-4}$, and a rate of change of the resistance value ranges from about 0.01% to about 3%.

Some embodiments of the present disclosure provide a touch panel. The touch panel comprises a display panel and a transparent cover plate, and a touch sensing layer interposed between the display panel and the transparent cover plate. The touch sensing layer comprises a transparent substrate, and the above transparent conductive oxide film for sensing deformation is located on the transparent substrate.

BRIEF DESCRIPTION OF THE DRAWINGS

FIG. 4A depicts a perspective schematic view of a touch panel according to some embodiments of this disclosure.

DETAILED DESCRIPTION

Figure 1A:
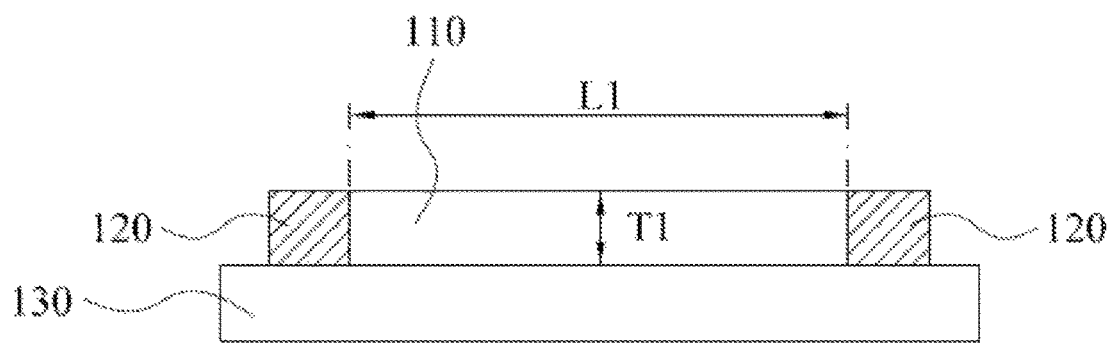
FIG. 1A depicts a schematic diagram of an indium tin oxide film when not being applied by an external force.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and elements are schematically depicted in order to simplify the drawings.

Some materials will generate a resistance change when being applied a stress. The change can be illustrated by the following formula: $R=\rho(L/W)$. In this formula, R is a resistance value, $\rho$ is resistivity, L and W are respectively a length and a cross sectional area of the material such as a piezoresistive material. When being applied an external force F, the material will generate deformation so that the length L will increase or decrease. A relationship between the external force and the deformation is as follows: $F=k \cdot \Delta L$. In the above formula, F is the external force, k is a coefficient of elasticity, and $\Delta L$ is a deformation amount of the material. When referring to the above two formulae, the deformation amount $\Delta L$ of the length will be generated by applying the external force F. Under the circumstances, the length L of the material changes, which in turn causes a change of the resistance value R. In greater detail, a negative deformation amount $\Delta L$ will be generated by applying a compressive stress. At this time, the length L of the piezoresistive material is decreased and the resistance value R of the piezoresistive material is reduced. In addition, a positive deformation amount $\Delta L$ will be generated by applying, a compressive stress or a tensile stress. At this time, the length L of the material is increased and the resistance value R of the material is increased. By using a change amount of the resistance value R, a material like this can be used in a touch sensing layer to detect a user's data input signal.

A transparent conductive oxide has the above property so as to serve as a sensing element in a touch sensing layer. However, a transparent conductive oxide usually has a lower coefficient of elasticity k. Hence, when the external force F being applied is excessive, the transparent conductive oxide tends to permanently deform or even cracks. In view of this fact, applications of the transparent conductive oxide are limited.

Therefore, the present disclosure provides a transparent conductive oxide film, which generates a resistance value change under a very small amount of deformation and can prevent cracking of the transparent conductive oxide film so as to increase the production yield. In greater detail, the present disclosure provides a transparent conductive oxide film that has a length and generates a deformation amount by applying an external force. A hand gap of the transparent conductive oxide film is thus changed to change a resistance value of the transparent conductive oxide film. A ratio of the deformation amount to the length ranges from about $5 \times 10^{-5}$ to about $3.5 \times 10^{-4}$. A rate of change of the resistance value ranges from about 0.01% to about 3%.

Figure 1B:
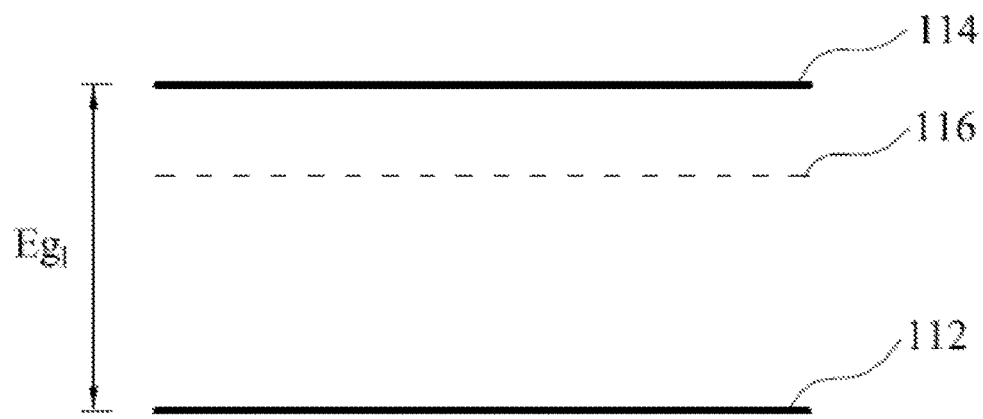
FIG. 1B depicts a band gap of an indium tin oxide film when not being applied by an external force.

In the following embodiments, an indium tin oxide film is taken as an example for illustration. However, it is noted that other transparent conductive oxide films can also be used in the present disclosure, and the present disclosure is not limited to the indium tin oxide film. A description is provided with reference to FIG. 1A and FIG. 1B. FIG. 1A depicts a schematic diagram of an indium tin oxide film when not being applied an external force. FIG. 1B depicts a band gap of an indium tin oxide film when not being applied an external force. As shown in FIG. 1A, an indium tin oxide film 110 is disposed on a transparent substrate 130. Two ends of the indium tin oxide film 110 are respectively connected contacts 120. When an external force is not applied, the indium tin oxide film 110 has a length L1 between the two contacts 120. At this time, a thickness of the indium tin oxide film 110 is T1. During operations, a signal representing resistance value change of the indium tin oxide film 110 is transmitted to the contacts 120, and the contacts 120 can further be connected to a processor (such as an integrated circuit) so as to calculate and/or sense a touch position and a force magnitude of a user. With additional reference to FIG. 1B, a valence band 112 and a conduction band 114 of the indium tin oxide film 110 are separated by a band gap $Eg_1$ when not being applied by an external force, and a donor level 116 is situated between the valence band 112 and the conduction band 114. It is noted that the indium tin oxide film 110 is an n-type semiconductor film formed by doping indium oxide with tin. In the indium tin oxide film 110, a tin ion ($Sn^{4+}$) that has one more valence number than an indium ion ($In^{3+}$) is adopted to dope indium oxide so as to replace indium ion and release one free electron. As a result, a concentration of free carriers is increased to reduce the resistance. In addition, an oxygen vacancy in the indium tin oxide film 110 refers to that a position of lattice oxygen is not filled so that two electrons in the bond are released to become free electrons. Hence, electrical conductivity of the indium tin oxide film 110 is increased by using an n-type donor to fill the oxygen vacancy. These free electrons are situated at the donor level 116 and easy to hop to the conduction band 114, thus rendering the indium tin oxide film 110 to have electrical conductivity.

Figure 2A:
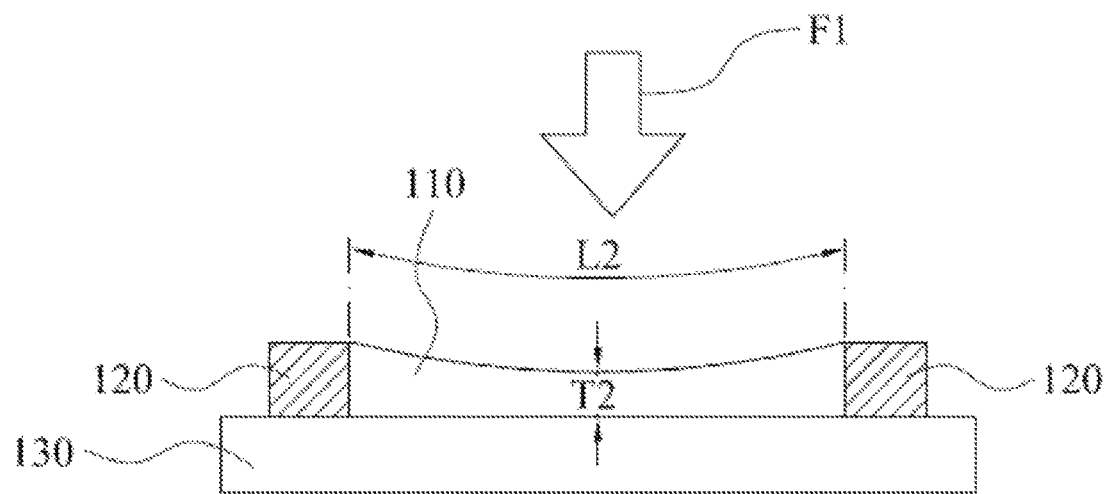
FIG. 2A depicts a schematic diagram of an indium tin oxide film when being applied by a compressive stress.
Figure 2B:
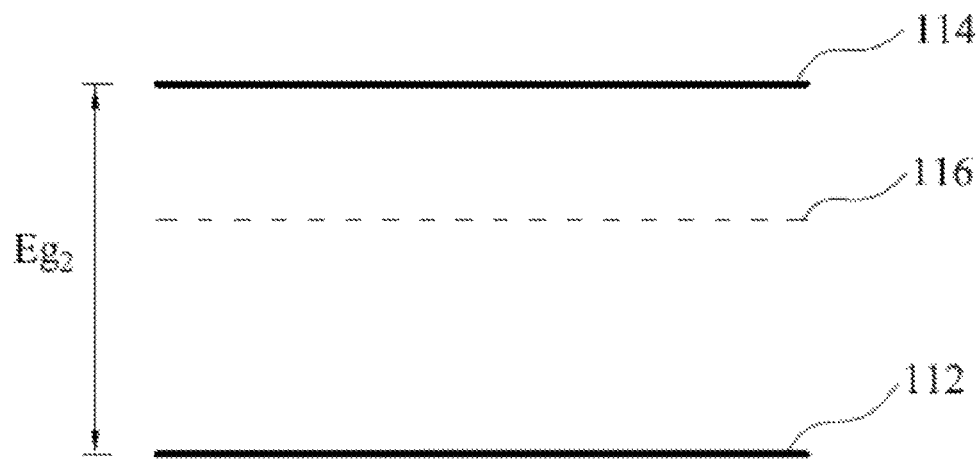
FIG. 2B depicts a band gap of an indium tin oxide film when being applied by a compressive stress.

A description is provided with reference to FIG. 2A and FIG. 2B. FIG. 2A depicts a schematic diagram of an indium tin oxide film when being applied a compressive stress. FIG. 2B depicts a band gap of an indium tin oxide film when being applied a compressive stress. As shown in FIG. 2A, when a compressive stress F1 is applied, the indium tin oxide film 110 will deform. The thickness T1 of the indium tin oxide film 110 is decreased to T2 and the indium tin oxide film 110 is depressed so that the length L1 is increased to L2. A description is provided with reference to FIG. 2B to understand the mechanism of resistance value change of the indium tin oxide film 110 under a small amount of deformation. The lattice orientation in the indium tin oxide film 110 is changed by applying the compressive stress F1 and the band gap of the indium tin oxide film 110 is changed. As shown in FIG. 2B, the band gap $Ep_1$ of the indium tin oxide film 110 is increased to $Eg_2$ by applying the compressive stress F1, which further increases a distance between energy levels of the donor level 116 and the conduction band 114. Under the circumstances, free electrons situated at the donor level 116 are more difficult to hop to the conduction baud 114, thus rendering the indium tin oxide film 110 to have a lower electrical conductivity and a higher resistance value. Taking the formula $R=\rho (L/W)$ for illustration, applying the compressive stress F1 increases the length L1 to L2. However, the lattice change of the indium tin oxide film 110 allows the resistivity $\rho$ to be increased. These two factors both affect the resistance value of the indium tin oxide film 110. In addition to that, the sensing of a resistance value change is performed under a very small amount of deformation according to the present disclosure, and a ratio of the deformation amount (T1−T2) to the length L2 ranges from about $5 \times 10^{-5}$ to about $3.5 \times 10^{-4}$. Under such a small deformation amount, a length value change (L2−L1) is also very small. Under these circumstances, the resistance value of the indium tin oxide film 110 is mainly changed because of the change of the resistivity $\rho$. In this manner, it can be observed that the resistance value of the indium tin oxide film 110 is increased by applying the compressive stress F1. In some embodiments of the present disclosure, when the ratio of the deformation amount (T1−T2) to the length L2 is about $3.5 \times 10^{-4}$ by applying the compressive stress F1, a rate of change of the resistance value of the indium tin oxide film 110 ranges from about 0.01% to about 0.07%.

Figure 3A:
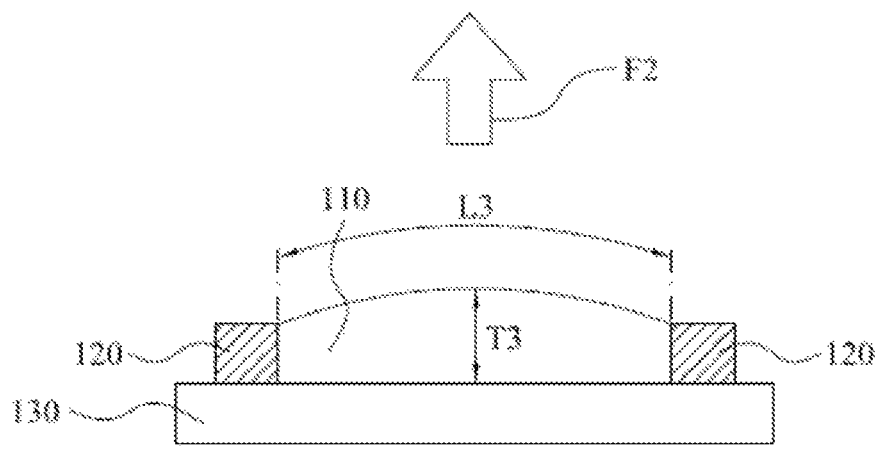
FIG. 3A depicts a schematic diagram of an indium tin oxide film when being applied by a tensile stress.
Figure 3B:
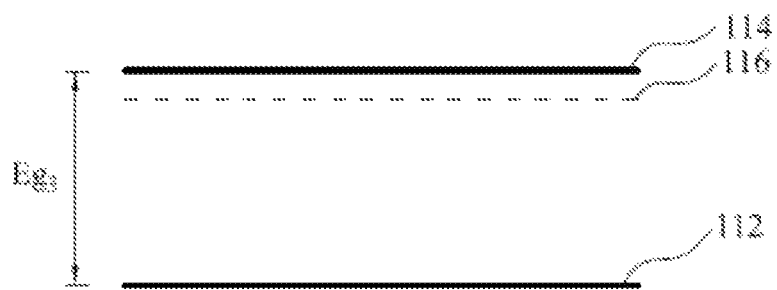
FIG. 3B depicts a band gap of an indium tin oxide film when being applied by a tensile stress.

A description is provided with reference to FIG. 3A and FIG. 3B. FIG. 3A depicts a schematic diagram of an indium tin oxide film when being applied a tensile stress. FIG. 3B depicts a band gap of an indium tin oxide film when being applied a tensile stress. As shown in FIG. 3A, when a tensile stress F2 is applied, the indium tin oxide film 110 will deform. The thickness T1 of the indium tin oxide film 110 is increased to T3, and the length L1 of the indium tin oxide film 110 is similarly increased to L3. As mentioned above, the resistance value should increase correspondingly when the length is increased. However, it is observed that the resistance value of the iridium tin oxide film 110 becomes lower. A description is provided with reference to FIG. 3B to understand the mechanism of resistance value change of the indium tin oxide film 110 under a small amount of deformation. Similarly, the lattice orientation in the indium tin oxide film 110 is changed by applying the tensile stress F2 and the band gap of the indium tin oxide film 110 is changed. As shown in FIG. 3B, the band gap $Eg_1$ of the indium tin oxide film 110 is decreased to $Eg_3$ by applying the tensile stress F2, which further decreases the distance between energy levels of the donor level 116 and the conduction band 114. Under these circumstances, it is easier for free electrons situated at the donor level 116 to hop to the conduction band 114, thus rendering the indium tin oxide film 110 to have a higher electrical conductivity and a lower resistance value. Taking the formula $R=\rho (L/W)$ for illustration, applying the tensile stress F2 increases the length L1 to L3. However, the lattice change of the indium tin oxide film 110 allows the resistivity $\rho$ to be decreased. These two factors both affect the resistance value of the indium tin oxide film 110. In addition to that, the sensing of the resistance value change is performed under a very small amount of deformation according to the present disclosure, a ratio of a deformation amount (T3−T1) to the length L3 ranges from about $5 \times 10^{-5}$ to about $3.5 \times 10^{-4}$. Under such a small deformation amount, a length value change (L3−L1) is also very small. Under these circumstances, the resistance value of the indium tin oxide film 110 is mainly changed because of the change of the resistivity ρ. In this manner, it can be observed that the resistance value of the indium tin oxide film 110 is decreased by applying the tensile stress F2. In some embodiments of the present disclosure, when the ratio of the deformation amount (T3−T1) to the length L3 is about $3.5 \times 10^{-4}$ by applying the tensile stress F2, the rate of change of the resistance value of the indium tin oxide film 110 ranges from about 0.01% to about 0.07%.

In summary, the resistance value of the indium tin oxide film 110 becomes lower by applying the tensile stress F2 and becomes higher by applying the compressive stress F1. Importantly, the ratio of the deformation amount caused by the tensile stress F2 or the compressive stress F1 to the length ranges from about $5 \times 10^{-5}$ to about $3.5 \times 10^{-4}$ to prevent the indium tin oxide film 110 from cracking or permanently deforming. In greater detail, when the ratio of the deformation amount of the indium tin oxide film 110 to the length exceeds $5 \times 10^{-4}$, the indium tin oxide film 110 starts to generate a crack so as to decrease the production yield. It is noted that the mechanisms of band gap changes of different transparent conductive oxides differ from the mechanism of band gap change of the indium tin oxide film 110 due to different lattice orientations. For example, the band gap of some other transparent conductive oxide film may become smaller and the resistance value is decreased when applying the compressive stress F1. Similarly, the tensile stress F2 may increase the band gap of some other transparent conductive oxide film to increase the resistance value.

In addition, a gas may be introduced when preparing the indium tin oxide film 110 to regulate a concentration of oxygen vacancies in the indium tin oxide film 110. The gas contains oxygen, argon, and hydrogen. A ratio of a volume of oxygen to a volume of the gas ranges from about 0.1% to about 10%. When oxygen is not sufficient, a large number of oxygen vacancies will be generated to distort the lattice and generate point defects, which hinder the conduction of free electrons so that the electrical conductivity is reduced and the rate of change of the resistance value is increased when the iridium tin oxide film 110 is applied by the external force. On the contrary, when an excessive amount of oxygen exists, extra oxygen will aggregate at the lattice boundaries and scattering is caused to reduce the mobility of free electrons and increase the rate of change of the resistance value when the indium tin oxide film 110 is applied the external force. Under the above two circumstances, the indium tin oxide film 110 has a higher rate of change of the resistance value to increase the change amount of the resistance value when the tensile stress F2 or the compressive stress F1 is applied. In other embodiments, the ratio of the volume of oxygen to the volume of the gas preferably ranges from about 1% to about 2% so that the rate of change of the resistance value can reach its maximum value when the indium tin oxide film 110 is applied a specific external force. In some embodiments, the rate of change of the resistance value of the indium tin oxide film 110 ranges from about 0.01% to about 0.5%. When the rate of change of the resistance value of the indium tin oxide film 110 becomes greater, deformation sensing is more sensitive. As a result, it is advantageous for sensing the touch position and force magnitude of a user.

A description is provided with reference to FIG. 4A. FIG. 4A depicts a perspective schematic view of a touch panel according to some embodiments of this disclosure. As shown in FIG. 4A, a touch panel 400 comprises a display panel 410, a touch sensing layer 420, and a transparent cover plate 430. The touch sensing layer 420 is interposed between the display panel 410 and the transparent cover plate 430. A material of the transparent cover plate 430 may comprise glass, sapphire, and/or some other suitable transparent material. The touch sensing layer 420 may comprise the above transparent conductive oxide. In greater detail, a user 410 can observe images displayed on the display panel 410 through the transparent cover plate 430 and the touch sensing layer 420, and intuitively touch the transparent cover plate 430 to operate programs and give instructions.

Figure 4B:
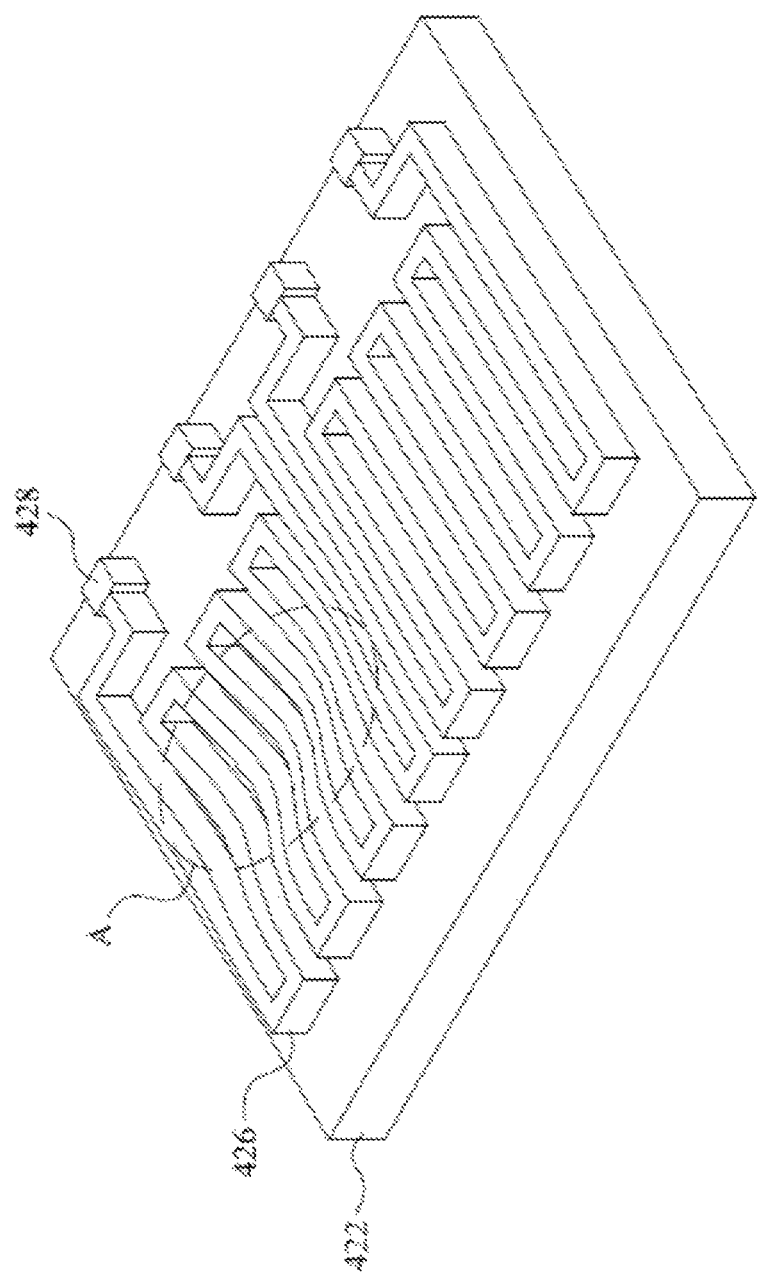
FIG. 4B depicts a perspective schematic view of a touch sensing layer according to some embodiments of this disclosure.

Then, a description is provided with reference to FIG. 4B. FIG. 4B depicts a perspective schematic view of a touch sensing layer according to some embodiments of this disclosure. As shown in FIG. 4B, the touch sensing layer 420 comprises a transparent substrate 422, and a transparent conductive oxide film 426 located on the transparent substrate 422. As mentioned previously, when the user 440 touches the transparent cover plate 430, a compressive stress is also simultaneously applied to the touch sensing layer 420. This compressive stress allows the transparent conductive oxide film 426 to deform so as to cause a resistance value change. As shown from the left side of FIG. 4B, the compressive stress causes the transparent conductive oxide film 426 in region A to be depressed and deformed so as to change its band gap, which in turn changes a resistance value of the transparent conductive oxide film 426. The transparent conductive oxide time 426 further transmits a resistance value change of region A to a contact 428, and the contact 428 is connected to a processor (not shown in the figure) so as to calculate and/or sense a touch position of the user 440. It is noted that although the transparent conductive oxide film 426 on the transparent substrate 422 having a pattern shown in FIG. 4B is taken for example, the present disclosure is not limited in this regard. Some other suitable patterns may also be applied without departing from the spirit of the present disclosure. In some embodiments of the present disclosure, a material of the transparent substrate 422 comprises polyethylene terephthalate (PET) or polycarbonate (PC).

It is thus understood from the embodiments of the present disclosure that the present disclosure has the following advantages. The transparent conductive oxide provided by the present disclosure generates the resistance value change under a very small amount of deformation, and the resistance value change is mainly caused by the change of band gap of the transparent conductive oxide when the transparent conductive oxide is deformed, which increases/decreases the distance between the donor level and the conduction band so as to make free electrons more easy/difficult to hop to the conduction band. As a result, the resistance value of the transparent conductive oxide is decrease/increased. In addition, taking indium tin oxide as an example, a gas may be introduced after preparing the indium tin oxide film to regulate the concentration of oxygen vacancies in the indium tin oxide film so as to increase the resistance value. The indium tin oxide film having a higher resistance value can have a greater resistance value change when a tensile stress or a compressive stress is applied, which is advantageous for sensing the touch position and force magnitude of a user.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A transparent conductive oxide film for sensing deformation, wherein:
the transparent conductive oxide film has a first length when no external force is applied,
the transparent conductive oxide film changes by a deformation amount upon an external force being applied to the transparent conductive oxide film so as to change a resistance value of the transparent conductive oxide film,
the deformation amount represents a difference between a thickness of the transparent conductive oxide film when no external force is applied and the thickness of the transparent conductive oxide film when the external force is applied,
the transparent conductive oxide film has a second length when the external force is applied,
a ratio of the deformation amount to the second length ranges from about $5 \times 10^{-5}$ to about $3.5 \times 10^{-4}$, and
a rate of change of the resistance value ranges from about 0.01% to about 3%.

2. The transparent conductive oxide film for sensing deformation of claim 1, wherein the transparent conductive oxide film is an indium tin oxide film.

3. The transparent conductive oxide film for sensing deformation of claim 2, wherein the indium tin oxide film has a number of oxygen vacancies as a result of a gas being introduced when preparing the indium tin oxide film to regulate a concentration of oxygen vacancies in the indium tin oxide film.

4. The transparent conductive oxide film for sensing deformation of claim 3, wherein introducing the gas allows the rate of change of the resistance value of the indium tin oxide film to increase.

5. The transparent conductive oxide film for sensing deformation of claim 4, wherein the gas has oxygen, argon, and hydrogen, and a ratio of a volume of oxygen to a volume of the gas ranges from about 0.1% to about 10%.

6. The transparent conductive oxide film for sensing deformation of claim 5, wherein the ratio of the volume of oxygen to the volume of the gas ranges from about 1% to about 2%.

7. The transparent conductive oxide film for sensing deformation of claim 2, wherein the external force is a compressive stress, and a band gap of the indium tin oxide film is increased by applying a compressive stress to allow the resistance value of the indium tin oxide film to increase.

8. The transparent conductive oxide film for sensing deformation of claim 2, wherein the external force is a tensile stress, and a band gap of the indium tin oxide film is decreased by applying the tensile stress to allow the resistance value of the indium tin oxide film to decrease.

9. The transparent conductive oxide film for sensing deformation of claim 2, wherein the rate of change of the resistance value of the indium tin oxide film ranges from about 0.01% to about 0.5%.

10. A touch panel comprising:
a display panel and a transparent cover plate; and
a touch sensing layer interposed between the display panel and the transparent cover plate, wherein the touch sensing layer comprises:
a transparent substrate; and
a transparent conductive oxide film for sensing deformation, wherein:
the transparent conductive oxide film has a first length when no external force is applied,
the transparent conductive oxide film changes by a deformation amount upon an external force being applied to the transparent conductive oxide film so as to change a resistance value of the transparent conductive oxide film,
the deformation amount represents a difference between a thickness of the transparent conductive oxide film when no external force is applied and the thickness of the transparent conductive oxide film when the external force is applied,
the transparent conductive oxide film has a second length when the external force is applied,
a ratio of the deformation amount to the second length ranges from about $5 \times 10^{-5}$ to about $3.5 \times 10^{-4}$, and
a rate of change of the resistance value ranges from about 0.01% to about 3%.

11. The touch panel of claim 10, wherein the transparent conductive oxide film is an indium tin oxide film.

12. The touch panel of claim 11, wherein the indium tin oxide film has a number of oxygen vacancies as a result of a gas being introduced when preparing the indium tin oxide film to regulate a concentration of oxygen vacancies in the indium tin oxide film.

13. The touch panel of claim 12, wherein introducing the gas allows the rate of change of the resistance value of the indium tin oxide film to increase.

14. The touch panel of claim 13, wherein the gas has oxygen, argon, and hydrogen, and a ratio of a volume of oxygen to a volume of the gas ranges from about 0.1% to about 10%.

15. The touch panel of claim 14, wherein the ratio of the volume of oxygen to the volume of the gas ranges from about 1% to about 2%.

16. The touch panel of claim 11, wherein the external force is a compressive stress, and a band gap of the indium tin oxide film is increased by applying the compressive stress to allow the resistance value of the indium tin oxide film to increase.

17. The touch panel of claim 11, wherein the external force is a tensile stress, and a band gap of the indium tin oxide film is decreased by applying the tensile stress to allow the resistance value of the indium tin oxide film to decrease.

18. The touch panel of claim 11, wherein the rate of change of the resistance value of the indium tin oxide film ranges from about 0.01% to about 0.5%.

19. An indium tin oxide film for sensing deformation having a length, and generating a deformation amount by applying an external force so as to change a resistance value of the indium tin oxide film, wherein:
the indium tin oxide film has a number of oxygen vacancies as a result of a gas being introduced when preparing the indium tin oxide film to regulate a concentration of oxygen vacancies in the indium tin oxide film,
a ratio of the deformation amount to the length ranging from about $5 \times 10^{-5}$ to about $3.5 \times 10^{-4}$,
a rate of change of the resistance value ranging from about 0.01% to about 3%, introducing the gas allows the rate of change of the resistance value of the indium tin oxide film to increase, and the gas has oxygen, argon, and hydrogen, and a ratio of a volume of oxygen to a volume of the gas ranges from about 0.1% to about 10%.

20. The indium tin oxide film for sensing deformation of claim 5, wherein the ratio of the volume of oxygen to the volume of the gas ranges from about 1% to about 2%.

* * * * *